United States Patent
Shimazaki (10) Patent No.: US 6,195,544 B1
(45) Date of Patent: Feb. 27, 2001

(54) METHOD OF READILY READING A RECEIVED MESSAGE AND MOBILE TELEPHONE USING THE SAME

(75) Inventor: Sadayoshi Shimazaki, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/157,538

(22) Filed: Sep. 21, 1998

(30) Foreign Application Priority Data

Sep. 30, 1997 (JP) .................................................. 9-266974

(51) Int. Cl.$^7$ .................................................. H04M 11/10
(52) U.S. Cl. ........................ 455/412; 455/415; 455/575
(58) Field of Search .......................... 455/412, 415, 455/519, 186.1, 518, 414, 550, 575, 422, 466, 413; 340/825.44

(56) References Cited

U.S. PATENT DOCUMENTS

| | | | | |
|---|---|---|---|---|
| 5,400,393 | * | 3/1995 | Knuth et al. ....................... | 379/88.27 |
| 5,687,216 | * | 11/1997 | Svensson .............................. | 455/412 |
| 5,748,709 | | 5/1998 | Sheerin .............................. | 379/88.22 |
| 5,768,349 | * | 6/1998 | Knuth et al. ....................... | 379/88.22 |
| 5,953,655 | * | 9/1999 | Oiwa .................................... | 455/412 |
| 6,075,983 | * | 6/2000 | Kumagai .............................. | 455/412 |

FOREIGN PATENT DOCUMENTS

| | | | | |
|---|---|---|---|---|
| 0 498 997 | 8/1992 | (EP) | .............................. | H04M/1/57 |
| 0 567 135 | 10/1993 | (EP) | .............................. | H04M/1/65 |
| 0 693 860 | 1/1996 | (EP) | .............................. | H04Q/7/32 |
| 2 280 084 | 1/1995 | (GB) | .............................. | H04M/1/65 |
| 2 286 507 | 8/1995 | (GB) | .............................. | H04Q/7/32 |
| 2 311 189 | 9/1997 | (GB) | .............................. | H04M/1/65 |
| 2 318 702 | 4/1998 | (GB) | .............................. | H04M/1/65 |
| 62-69764 | 3/1987 | (JP) | .............................. | H04M/3/42 |
| 63-211949 | 9/1988 | (JP) | .............................. | H04M/1/65 |
| 63-256039 | 10/1988 | (JP) | .............................. | H04M/1/66 |
| 1-248738 | 10/1989 | (JP) | .............................. | H04M/1/65 |
| 1-284045 | 11/1989 | (JP) | .............................. | H04M/1/66 |
| 3-83441 | 4/1991 | (JP) | .............................. | H04M/1/65 |
| 4-167744 | 6/1992 | (JP) | .............................. | H04M/1/65 |
| 4-265046 | 9/1992 | (JP) | .............................. | H04M/3/42 |
| 6-169339 | 6/1994 | (JP) | .............................. | H04M/1/65 |
| 7-30636 | 1/1995 | (JP) | .............................. | H04M/1/64 |
| 8-228220 | 9/1996 | (JP) | .............................. | H04M/1/57 |
| 9-81268 | 3/1997 | (JP) | .............................. | G60F/1/16 |
| 9-93319 | 4/1997 | (JP) | .............................. | H04M/1/02 |
| 9-130486 | 5/1997 | (JP) | .............................. | H04M/3/42 |
| 9-214595 | 8/1997 | (JP) | .............................. | H04M/1/64 |
| 95/06996 | 3/1995 | (WO) | .............................. | H04M/11/00 |

* cited by examiner

*Primary Examiner*—Fan Tsang
*Assistant Examiner*—Rafael Perez-Gutierrez
(74) *Attorney, Agent, or Firm*—Young & Thompson (57) ABSTRACT

In a mobile telephone, received messages can be readily confirmed and are grouped to be readily read. The mobile telephone includes a storage unit, a unit for setting a plurality of groups, and a unit for storing message data. Each of a plurality of telephone numbers is allocated to any of the plurality of groups. The unit for storing message data stores the message data into a storage region of the storage unit corresponding to at least one of the plurality of groups based on an identifier corresponding to the message data when the message data corresponding to one selected from the plurality of telephone numbers is received.

30 Claims, 5 Drawing Sheets

METHOD OF READILY READING A RECEIVED MESSAGE AND MOBILE TELEPHONE USING THE SAME

BACKGROUND OF THE INVENTION

1. Field of the Invention

The present invention generally relates to a mobile telephone and more specifically, to a method of readily confirming a received message and a mobile telephone for the same.

2. Description of the Related Art

In a conventional mobile telephone, messages transmitted from counter parties (message senders) via base stations are merely stored into a storage unit in the message reception order. Also, in the conventional mobile telephone, when the messages stored in the storage unit are read, these messages are merely read in the message storage order.

For the reason, when these received messages are displayed to be confirmed, these messages are displayed at random irrespective of the message senders. As a result, a message from a desirable message sender cannot be immediately confirmed. Also, since tones used to notify that receptions of messages are completed are identical to all the message senders, the desirable message sender cannot be distinguished from the other message senders unless the received messages are actually read.

Japanese Laid Open Patent Application, (JP-A-Heisei 7-30636) discloses the technique related to the radio telephone apparatus. In this radio telephone apparatus, telephone numbers and the telephone number groups to which these telephone numbers belong are previously stored, and an answer message to an arrived call is stored for every telephone number group. In the radio telephone apparatus, when a telephone number of one telephone caller is received, the telephone number of this telephone caller is compared with the telephone number contained in the telephone number group so as to detect the telephone number group to which this telephone number of this telephone caller belongs. Then, the answer message corresponding to this detected telephone number group is transmitted to the telephone caller. However, this conventional radio telephone apparatus is not equipped with any means for solving the above-described problems as to the reception of the message and the confirmation of this message.

Also, Japanese Laid Open Patent Application, (JP-A-Showa 62-69764) discloses the technique on the message telephone. In this conventional message telephone, a message is registered in a message file based on a request from a subscriber as a telephone receiver, and the message file and a file processing apparatus are connected to a central processing apparatus of a switching unit. However, in this radio telephone apparatus, there is no means which can solve the above-described problems as to the receptions of the messages and the confirmations of these messages.

Also, Japanese Laid Open Patent Application, (JP-A-Showa 63-256039) describes the technique about the message sender discriminating apparatus. This discriminating apparatus is an apparatus which can discriminate a specific message sender upon arrival of a call to select the specific message sender from among unspecified message senders, and to receive a message. However, this conventional message sender discriminating apparatus is not equipped with means which can solve the problems as to the receptions of the messages and the confirmations of these messages.

Further, Japanese Laid Open Patent Application, (JP-A-Heisei 1-284045) discloses the technique for the electronic telephone receiver with a calling tone discriminating function. In this telephone receiver with the calling tone discriminating function, who is called by a telephone caller is determined before a called party answers to this telephone call when the single telephone receiver is used by users. In this telephone receiver with the calling tone discriminating function, the respective ID codes of the users are previously stored, and a plurality of call receiving tone sources are provided for the respective users. In this telephone receiver, one of the calling tones is selected based on the ID code transmitted from the telephone caller, and this telephone may notify who is called before the counter party answers to this telephone call. However, this conventional telephone receiver with the calling tone discriminating function is not equipped with means which can solve the above-described problems as to the receptions of the messages and the confirmations of these messages.

Furthermore, Japanese Laid Open Patent Application (JP-A-Heisei 8-228220) discloses the technique related to the digital cordless telephone apparatus. In the telephone apparatus, the mobile station stores a plurality of telephone numbers for the telephone callers without producing the telephone calling tones when the telephone calls are received. The mobile station shows the receptions of the telephone calls and also the storage of the telephone numbers for the telephone callers. This digital cordless telephone apparatus sequentially displays a plurality of stored telephone numbers of the telephone callers in response to the key operations. When the relevant telephone number is displayed among the sequentially displayed telephone numbers, the user manipulates the telephone call key such that the relevant telephone number is called. However, the digital cordless telephone apparatus merely stores the received telephone numbers of the telephone callers and sequentially displays these telephone numbers. The digital cordless telephone apparatus is not provided with the means for solve the above-described problems related to the receptions of the messages and the confirmations.

SUMMARY OF THE INVENTION

The present invention is made to solve the problems in conventional technique as mentioned above. An object of the present invention is to provide a method and a mobile telephone for storing received messages in units of groups.

Another object of the present invention is to provide a message receiving method and a mobile telephone in which a tone informing message reception is changed for every group.

A further object of the present invention is to provide a message receiving method and a mobile telephone which can select a received message and output this selected message to an external equipment such as a personal computer.

In order to achieve an aspect of the present invention, a method of manipulating transmitted messages in a mobile telephone includes the steps of setting a plurality of groups, allocating each of a plurality of telephone numbers to any one of the plurality of groups, and when message data corresponding to one selected from among the plurality of telephone numbers is received, storing the message data into a storage region corresponding to at least one of the plurality of groups based upon an identifier corresponding to the message data.

A method of manipulating transmitted messages further may include the step of reading the stored message data.

In order to achieve another aspect of the present invention, the step of setting a plurality of groups includes entering one of the plurality of telephone numbers, entering a name of any one group of the plurality of groups, which is allocated with the entered telephone number, and allocating the storage region to the group having the entered name.

In order to achieve still another aspect of the present invention, the step of setting a plurality of groups further includes the step of allocating each of notification sounds different from each other to one of the plurality of groups to notify the reception of the message data.

In this case, the step of setting a plurality of groups includes allocating the entered telephone number to any one of the plurality of groups.

Also, the step of setting a plurality of groups includes allocating the entered telephone number to at least two groups of the plurality of groups.

In order to achieve yet still another aspect of the present invention, the step of setting a plurality of groups includes entering a first one of the plurality of telephone numbers, entering a name of a first one among the plurality of groups, which is allocated with the first telephone number, allocating a first memory area of the storage region to the first group, entering a second one of the plurality of telephone numbers, entering as a second name, a name of a specific one of the plurality of groups, which is allocated with the second telephone number, judging whether or not the second name is coincident with the name of the first group, when the second name is not coincident with the name of the first group, allocating a second memory area of the storage region to the specific group, and wherein the step of storing the message data includes storing the first telephone number into the first memory area, when the second name is coincident with the name of the first group, storing the second telephone number into the first memory area, and when the second name is not coincident with the name of the first group, storing the second telephone number into the second memory area.

In this case, the method of manipulating transmitted messages further includes the step of displaying a list of the entered names of the plurality of groups.

The step of storing the message data includes storing the message data into the storage region where a single message data can be stored.

The step of storing the message data may include storing a plurality of the message data into the storage region.

Also, the step of storing the message data includes when the message data is received, judging whether or not a specific telephone number corresponding to the message data is coincident with any one of the plurality of telephone numbers allocated to any one of the plurality of groups, and determining the storage region used to store the message data based on the judgment result.

Further, the step of storing the message data includes when the message data is received, judging whether or not a specific telephone number corresponding to the message data is coincident with any one of the plurality of telephone numbers allocated to any one of the plurality of groups, when the specific telephone number is coincident with any one of the plurality of telephone numbers, storing the message data into the storage region corresponding to at least one of the plurality of groups, which is allocated with any one of the plurality of telephone numbers, which is coincident with the specific telephone number, and when the specific telephone numbers are not coincident with any one of the plurality of telephone numbers, storing the message data into a remaining storage region other than the plurality of storage regions corresponding to the plurality of groups.

In this case, each of notification sounds is previously allocated to one of the plurality of groups, and wherein the step of storing the message data further includes the step of when the message data is received, producing one of the notification sounds which is allocated to any one of the plurality of groups based on the identifier corresponding to the message data.

The step of reading the message data may include designating at least one of the plurality of groups, and reading the message data stored in the storage region corresponding to the at least designated one of the plurality of groups.

Also, the step of designating at least one of the plurality of groups may include displaying a list of names previously entered for the plurality of groups.

Further, the step of reading the message data includes in response to a message data readout request sent from an external appliance, outputting the message data which is stored in at least one of the plurality of storage regions corresponding to at least one of the plurality of groups designated by the message data readout request.

A mobile telephone includes a storage unit, a unit for setting a plurality of groups, each of a plurality of telephone numbers being allocated to any one of the plurality of groups, and a unit for storing message data into a storage region of the storage unit corresponding to at least one of the plurality of groups based upon an identifier corresponding to the message data when the message data corresponding to one selected from the plurality of telephone numbers is received.

The mobile telephone further includes a unit for reading the message data from the storage unit.

The unit for setting a plurality of groups may include a unit for entering one of the plurality of telephone numbers, a unit for entering a name of any one group of the plurality of groups, which is allocated with the entered telephone number and a unit for allocating the storage region to the group having the entered name.

In this case, the unit for setting a plurality of groups further includes a plurality of units respectively allocated to the plurality of groups, wherein one of the plurality of units corresponding to the message notifies the reception of the message data.

Also, the unit for setting a plurality of groups includes a unit for allocating the entered telephone number to any one of the plurality of groups.

In this case, the unit for setting a plurality of groups may include a unit for allocating the entered telephone number to at least two groups of the plurality of groups.

The means for setting a plurality of groups includes a unit for entering a first one of the plurality of telephone numbers, a unit for entering a name of a first one of the plurality of groups, which is allocated with the first telephone number, a unit for allocating a first memory area of the storage region to the first group, a unit for entering a second one of the plurality of telephone numbers, a unit for entering as a second name, a name of a specific one of the plurality of groups which is allocated with the second telephone number, a unit for judging whether or not the second name is coincident with the name of the first group, and a unit for allocating a second memory area of storage region to the specific group when the second name is not coincident with the name of the first group, and wherein the means for storing the message data includes a unit for storing the first telephone number into the first memory area, a unit for storing the second telephone number into the first memory area when the second name is coincident with the name of the first group, and a unit for storing the second telephone number into the second memory area when the second name is not coincident with the name of the first group.

The mobile telephone further includes a unit for displaying a list of the entered names of the plurality of groups.

In this case, the means for storing the message data stores the message data into the storage region where a single message data can be stored.

The means for storing the message data may store a plurality of the message data into the storage region.

Also, the means for storing the message data includes a unit for judging whether or not a specific telephone number corresponding to the message data is coincident with any one of the plurality of telephone numbers allocated to any one of the plurality of groups when the message data is received, and a unit for determining the storage region for storing the message data based on the judgment result.

The unit for storing the message data includes a unit for judging whether or not a specific telephone number corresponding to the message data is coincident with any one of the plurality of telephone numbers allocated to any one of the plurality of groups when the message data is received, a unit for storing the message data into the storage region corresponding to at least one of the plurality of groups, which is allocated with any one of the plurality of telephone numbers, which is coincident with the specific telephone number when the specific telephone number is coincident with any one of the plurality of telephone numbers, and a unit for storing the message data into a remaining storage region other than the plurality of storage regions corresponding to the plurality of groups when the specific telephone number is not coincident with any one of the plurality of telephone numbers.

In this case, each of the plurality of units is previously allocated to one of the plurality of groups, and wherein the means for storing the message data further includes a unit for producing one of the notification sounds which is allocated to any one of the plurality of groups based upon the identifier corresponding to the message data when the message data is received.

The unit for reading the message data includes a unit for designating at least one of the plurality of groups, and a unit for reading the message data stored in the storage region corresponding to the designated one of the plurality of groups.

Also, the means for designating at least one of the plurality of groups includes a unit for displaying a list of names previously entered for the plurality of groups.

The means for reading the message data includes in response to a message data readout request sent from an external appliance, outputting the message data which is stored in at least one of the plurality of storage regions corresponding to at least one of the plurality of groups designated by the message data readout request.

BRIEF DESCRIPTION OF THE DRAWINGS

For a better understanding of the present invention, reference is made of a detailed description to be read in conjunction with the accompanying drawings, in which.

DESCRIPTION OF THE PREFERRED EMBODIMENTS

Referring now to drawings, a mobile telephone according to an embodiment of the present invention will be described.

Figure 1:
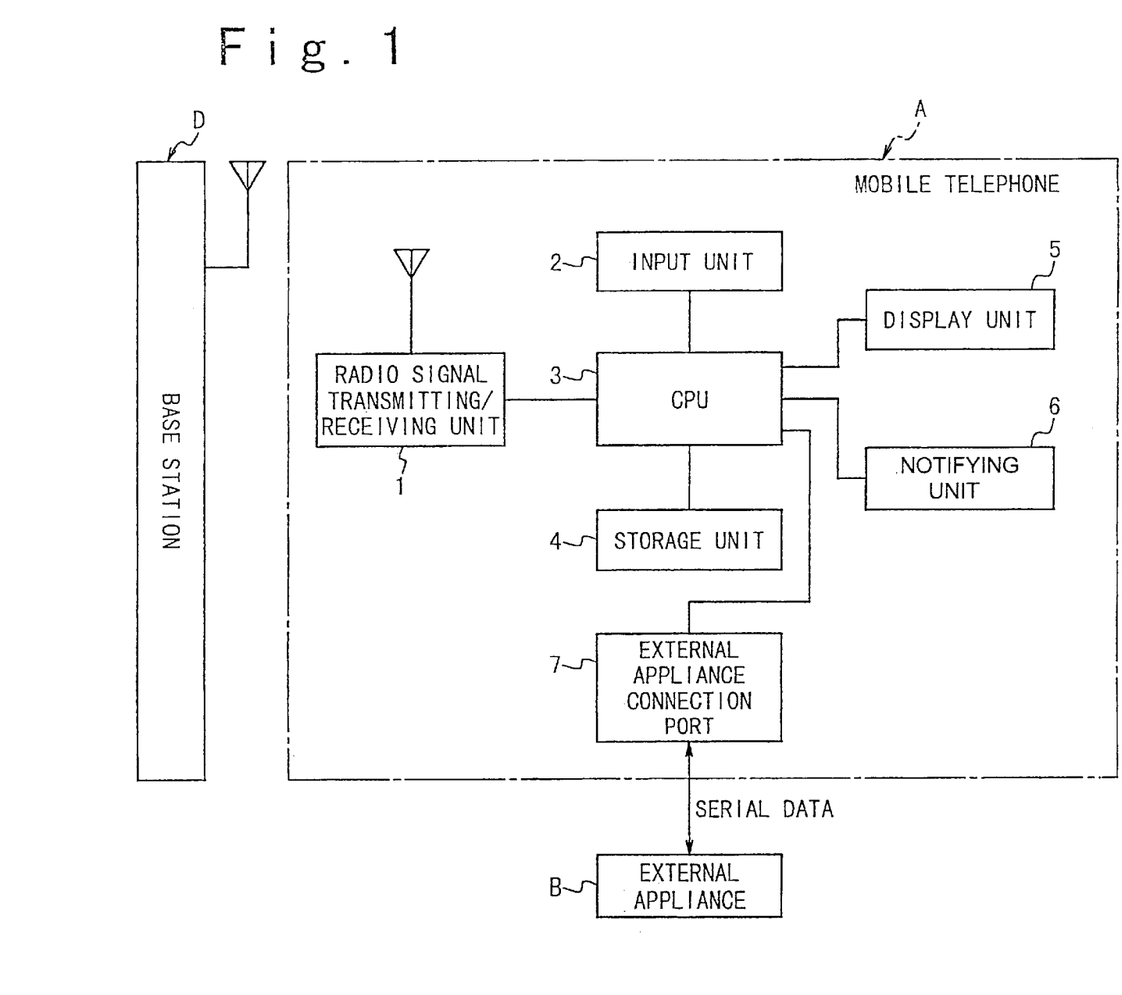
FIG. 1 schematically shows a system arrangement of a mobile telephone according to an embodiment of the present invention.

As indicated in FIG. 1, a mobile telephone "A" is composed of a radio signal transmitting/receiving unit 1, an input unit 2, a CPU (central processing unit) 3, a storage unit 4, a display unit 5, a notifying unit 6, and an external equipment connection port 7.

The mobile telephone A is a mobile station connected to a base station "D" via a radio (wireless) signal. The mobile telephone A can be a portable telephone or an automobile telephone.

The radio signal transmitting/receiving unit 1 transmits and/or receives various data signal such as a speech signal and a control signal between this radio signal transmitting/receiving unit 1 and the base station D.

The input unit 2 is composed of various sorts of operation keys used to enter telephone numbers into this mobile telephone A.

The CPU 3 is composed of a microcomputer, and controls/instructs the entire system of this mobile telephone A.

The storage unit 4 stores a control program and a system calling signal.

The display unit 5 is composed of a liquid crystal display (LCD) unit for displaying a received message.

The external equipment connection port 7 is a port for connecting an external equipment "B" to this portable telephone "A".

In the portable telephone A, the CPU 3 is additionally provided with the below-mentioned functions. That is, this CPU 3 is provided with a grouping operation setting function, a grouping operation storage function, a group selecting/reading function, a calling tone setting function, and a notifying function.

The grouping operation setting function sets groups and further classifies and allocates telephone numbers entered from the input unit 2 to the groups.

The grouping operation storage function determines a counter party telephone number of a message received by the radio signal transmitting/receiving unit 1. The grouping operation storage function selects one of the groups for the received message based upon this determination result, and stores the received message into a storage region of the storage unit 4 corresponding to the selected group.

The group selecting/reading function reads, from the storage unit 4, the messages for a group arbitrarily selected by the input unit 2, and outputs the read messages to the display unit 5.

The calling tone setting function sets a calling tone to every group set by the grouping operation setting function.

The notifying function drives the notifying unit 6 to notify the reception of a message with a calling tone set for a group by the calling tone setting function.

The external output function reads messages from the storage unit 4 in response to a readout request (namely, readout request for each group, or readout request for all messages) issued from the external equipment B connected to the external equipment connection port 7. Then, this external output function transmits the read messages to this external equipment B.

Referring now to FIGS. 2 to 5, the operation of the mobile telephone "A" according to this embodiment will be described in detail.

Figure 2:
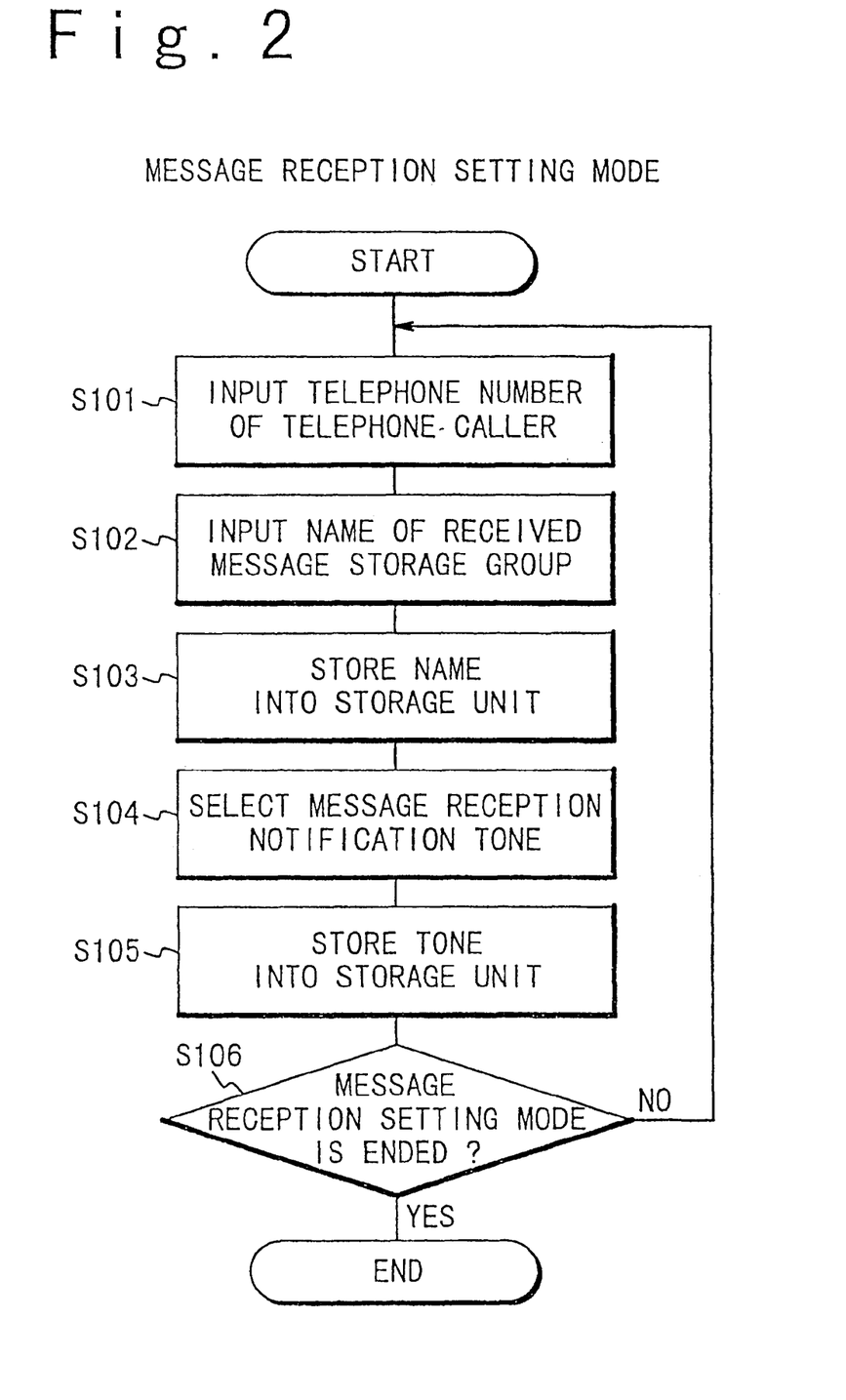
FIG. 2 is a flow chart for describing a message reception setting operation of the mobile telephone indicated in FIG. 1.
Figure 3:
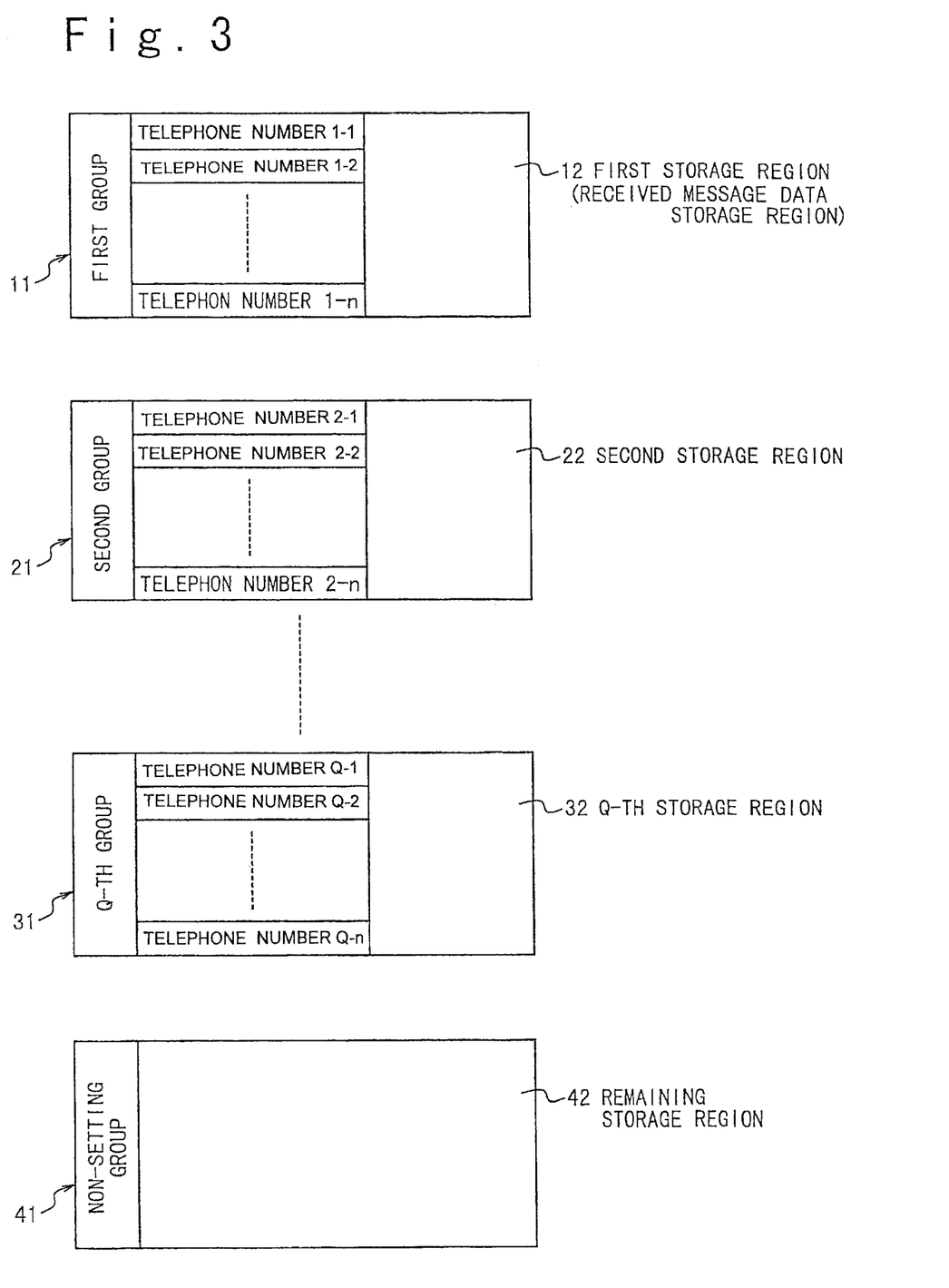
FIG. 3 illustratively represents a memory table employed in the storage unit of the mobile telephone according to this embodiment.
Figure 4:
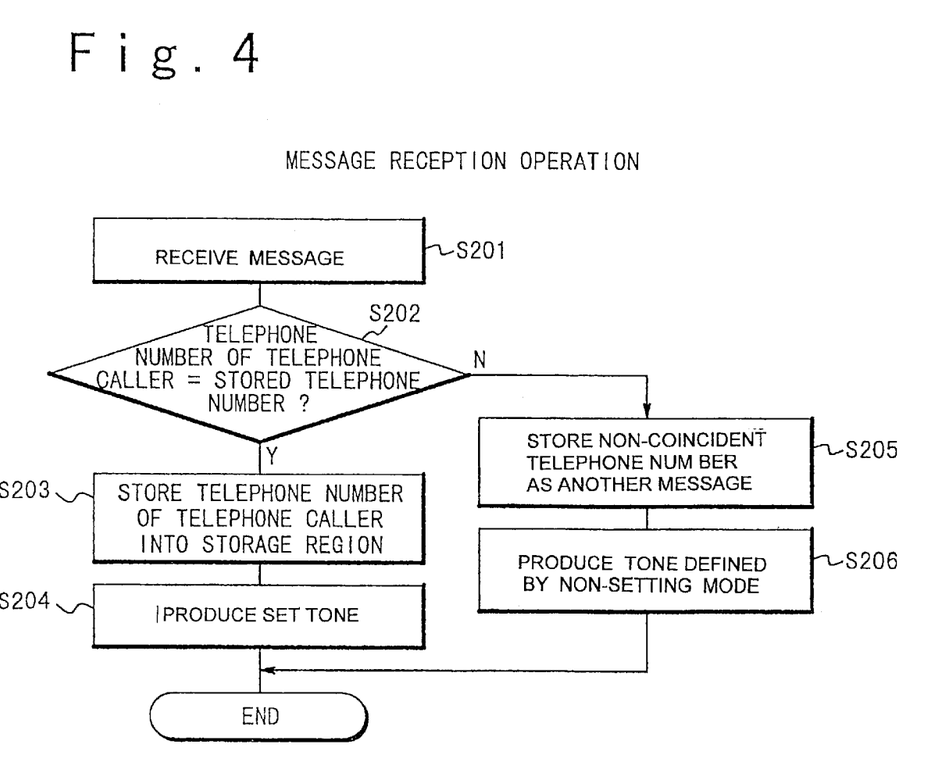
FIG. 4 is a flow chart for describing a message receiving operation of the mobile telephone according to this embodiment.
Figure 5:
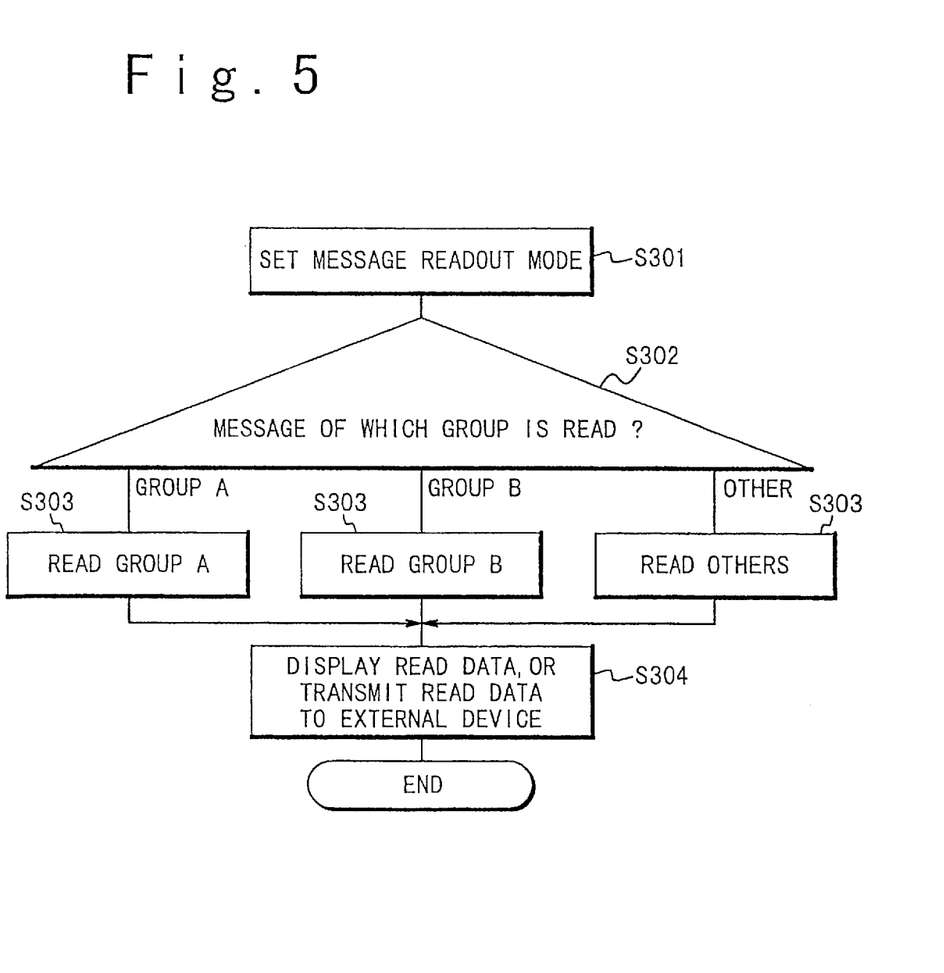
FIG. 5 is a flow chart for explaining a message reading operation of the mobile telephone according to this embodiment.

FIG. 2 is a flow chart for describing a message reception setting operation of the mobile telephone "A". FIG. 3 illustratively represents a memory table employed in the storage unit of the mobile telephone "A". FIG. 4 is a flow chart for describing a message receiving operation of the mobile telephone "A". FIG. 5 is a flow chart for explaining a message reading operation of the mobile telephone "A".

As shown in the flow chart of FIG. 2, in a group setting mode, a user enters a telephone number of a telephone caller to be registered by manipulating the input unit 2 (step S101). Next, the user enters a name of a group into which message data sent from this telephone caller should be stored (step S102). The telephone number entered at the previous step S101 is stored into the storage unit 4 such that this entered telephone number is allocated to the group whose name has been inputted at the step S102 (step S103).

The user selects one of tones (notification sounds) for notifying the reception of the message by the input unit 2 for every group name entered at the step S102 (step S104). A data corresponding to the tone selected at the step S104 is stored into the storage unit 4 such that the selected tone is related to the group name entered at the step S102 (step S105).

Thereafter, the CPU 3 confirms whether or not the message reception setting operation is ended (step S106). If the message reception setting operation is not ended, then this setting operation can be continuously performed.

When the message reception setting operation (second message reception setting operation) for a second telephone number is continuously performed, the second telephone number is entered at the step S101. Next, at the step S102, the user enters a name of a group as a second name, for storing message data corresponding to the second telephone number. At this time, the CPU 3 determines whether or not this second name is coincident with the name (the first name) inputted at the first message reception setting operation.

When the second name is not coincident with the first name as a result of the determination, another group (indicated by reference numeral 21 of FIG. 3) different from the first group (indicated by reference numeral 11 of FIG. 3) is newly set. The second telephone number is stored into the storage unit 4 such that the second telephone number is allocated to the new group (step S103). Thereafter, the steps S104 and S105 are performed in a similar manner to the first message reception setting operation.

To the contrary, when the second name is coincident with the first name as a result of the determination, the second telephone number is stored into the storage unit 4 such that the second telephone number is allocated to the group set at the first message reception setting operation without being the new group set. It should be noted that when the second name is coincident with the first name the process operation is advanced to a further step S106, while jumping over the steps S104 and S105.

When the message reception setting operation is performed, a message storage table as indicated in FIG. 3 is produced. The message storage table contains a plurality of group tables which are provided in units of groups.

A first group table 11 contains a first storage region 12 for storing received message data, and a plurality of telephone numbers 1-1, 1-2, - - - , 1-n corresponding to the message data which are stored into the first storage region 12.

Similarly, a second group table 21 contains a second storage region 22 for storing received message data, and a plurality of telephone numbers 2-1, 2-2, - - - , 2-n corresponding to the message data which are stored into the second storage region 22.

The message storage table contains a non-setting table 41 which is not set by the user other than the first group table 11 through a Q-th group table 31, corresponding to the first group through the Q-th group set by the user. This non-setting table 41 contains a non-setting storage region (remaining storage region) 42. The non-setting storage region 42 is used to store message data corresponding to telephone numbers which are not allocated to each of the first group through the Q-th group set by the user.

In this case, the user can allocate the same telephone number to a plurality of groups. In other words, in FIG. 3, for example, the telephone number 1-2 allocated to the first group is identical to the telephone number 2-1 allocated to the second group. In this case, the message data corresponding to the telephone number 1-2 (otherwise 2-1) is stored into both the first storage region 12 and the second storage region 22.

When the message data corresponding to the telephone number 1-2 (otherwise 2-1) cannot be stored into the first storage region 12 because of a shortage of the memory capacity, the message is stored only into the second storage region 22.

In a message readout mode shown in FIG. 4, the message data corresponding to the telephone number 1-2 (otherwise 2-1), which has been stored into both the first storage region 12 and the second storage region 22, is read when any one of the first group and the second group is designated.

As indicated in FIG. 4, when message data is received by the radio signal transmitting/receiving unit 1 (step S201), the CPU 3 reads the telephone numbers 1-1, 1-2, 1-n, 2-1, 2-2, 2-n, Q-1, Q-2, and Q-n which have been stored into the storage unit 4. Then, the CPU 3 checks whether or not the telephone number of the telephone caller corresponding to the received message data is present in these read telephone numbers 1-1, 1-2, 1-n, 2-1, 2-2, 2-n, Q-1, Q-2, and Q-n (step S202).

When the telephone number of the telephone caller is coincident with the read telephone number, the received message data is stored into the storage regions 12, 22, 32 of the groups 11, 21, 31, to which the telephone number is allocated (step S203). Thereafter, the notifying unit 6 is driven to produce a calling tone which is preset to the group name (step S204). It should also be noted that the storage region to store the received message data is determined based upon the telephone number of the telephone caller corresponding to the received message data as a identifier. Alternatively, this identifier is not limited to the telephone number, but may be, such as, an identification number.

Conversely, when the relevant telephone number is not stored in the storage unit 4 at the step S202, the received message data is stored into the non-setting storage region 42 of the non-setting table 41 (step S205), and then the notifying unit 6 is driven to produce a calling tone set for the non-setting group (step S206).

As indicated in the flow chart of FIG. 5, when a message readout mode (step S301) is set, a list of the names of the presently set groups 11, 21, 31 is displayed on the display unit 5, for the user to select at least one of these groups 11, 21, 31 (step S302). When the user selects either the non-setting group 41 or the name of an arbitrary group from the groups 11, 21, 31,(step S303), either the message corresponding to the selected one is read out from the storage unit 4, and is displayed on the display unit 5.

When the external equipment B such as a personal computer requests to read the respective groups, or to read all of the messages in a serial data form, the messages corresponding to the request are read out from this storage unit 4, and then are transmitted to the external equipment B.

As previously described in detail, in accordance with the message receiving method of the present invention, since the received messages can be automatically grouped and the grouped messages can be stored and also read, the received messages can be readily read and further the messages can be easily grouped.

Also, according to the message receiving method of the present invention, since the tones used to notify the receptions of the messages can be changed for every group, the group of the telephone caller can be identified at the same time when the message data of this telephone caller is received. As a result, it is possible to improve the reception confirmation function.

Furthermore, according to the present invention, the message stored in the storage unit under such a grouped condition can be read out from this storage unit in response to the request issued from the external equipment, and then this read message can be transmitted to this requesting external equipment. As a consequence, while using the external equipment such as a personal computer, the messages can be selected to be acquired with respect to each of the groups.

What is claimed is:

1. A method of manipulating transmitted messages, in a mobile telephone, comprising the steps of:
   setting a plurality of groups;
   allocating each of a plurality of telephone numbers to any one of said plurality of groups; and
   when message data corresponding to one selected from among said plurality of telephone numbers is received, storing said message data into a storage region corresponding to at least one of said plurality of groups based upon an identifier corresponding to said message data,
   wherein said step of storing said message data includes:
      when said message data is received, judging whether or not a specific telephone number corresponding to said message data is coincident with any one of said plurality of telephone numbers allocated to any one of said plurality of groups;
      when said specific telephone number is coincident with any one of said plurality of telephone numbers, storing said message data into said storage region corresponding to at least one of said plurality of groups, which is allocated with any one of said plurality of telephone numbers, which is coincident with said specific telephone number; and
      when said specific telephone number is not coincident with any one of said plurality of telephone numbers, storing said message data into a remaining storage region other than the plurality of storage regions corresponding to said plurality of groups.

2. A method of manipulating transmitted messages in a mobile telephone, comprising the steps of:
   setting a plurality of groups;
   allocating each of a plurality of telephone numbers to any one of said plurality of groups; and
   when message data corresponding to one selected from among said plurality of telephone numbers is received, storing said message data into a storage region corresponding to at least one of said plurality of groups based upon an identifier corresponding to said message data,
   wherein said step of setting a plurality of groups includes entering one of said plurality of telephone numbers,
      entering a name of any one group of said plurality of groups, which name is allocated with said entered telephone number, and
      allocating said storage region to said group having said entered name.

3. A method of manipulating transmitted messages according to claim 2, further comprising the step of:
   reading said stored message data.

4. A method of manipulating transmitted messages according to claim 3, wherein said step of reading said message data includes:
   designating at least one of said plurality of groups; and
   reading said message data stored in said storage region corresponding to said at least designated one of said plurality of groups.

5. A method of manipulating transmitted messages according to claim 4, wherein said step of designating at least one of said plurality of groups includes:
   displaying a list of names previously entered for said plurality of groups.

6. A method of manipulating transmitted messages according to claim 3, wherein said step of reading said message data includes:
   in response to a message data readout request sent from an external appliance, outputting said message data which is stored in at least one of said plurality of storage regions corresponding to at least one of said plurality of groups designated by said message data readout request.

7. A method of manipulating transmitted messages according to claim 2, wherein said step of setting a plurality of groups, further comprising the step of:
   allocating each of a plurality of notification sounds different from each other to one of said plurality of groups to notify the reception of said message data.

8. A method of manipulating transmitted messages according to claim 7, wherein said each of notification sounds is previously allocated to one of said plurality of groups, and
   wherein said step of storing said message data further comprises the step of:
      when said message data is received, producing one of said notification sounds which is allocated to any one of said plurality of groups based on said identifier corresponding to said message data.

9. A method of manipulating transmitted messages according to claim 2, wherein said step of setting a plurality of groups includes allocating said entered telephone number to any one of said plurality of groups.

10. A method of manipulating transmitted messages according to claim 2, wherein said step of setting a plurality of groups includes allocating said entered telephone number to at least two groups of said plurality of groups.

11. A method of manipulating transmitted messages according to claim 2, wherein said step of setting a plurality of groups includes:

entering a first one of said plurality of telephone numbers;

entering a name of a first one among said plurality of groups, which is allocated with said first telephone number;

allocating a first memory area of said storage region to said first group;

entering a second one of said plurality of telephone numbers, entering as a second name, a name of a specific one of said plurality of groups, which is allocated with said second telephone number;

judging whether or not said second name is coincident with the name of said first group;

when said second name is not coincident with the name of said first group, allocating a second memory area of said storage region to said specific group, and wherein said step of storing said message data includes:
storing said first telephone number into said first memory area;
when said second name is coincident with the name of said first group, storing said second telephone number into said first memory area; and
when said second name is not coincident with the name of said first group, storing said second telephone number into said second memory area.

12. A method of manipulating transmitted messages according to claim 2, further comprising the step of:
displaying a list of said entered names of said plurality of groups.

13. A method of manipulating transmitted messages according to claim 2, wherein said step of storing said message data includes:
storing said message data into said storage region where a single message data can be stored.

14. A method of manipulating transmitted messages according to claim 2, wherein said step of storing said message data includes:
storing a plurality of said message data into said storage region.

15. A method of manipulating transmitted messages according to claim 2, wherein said step of storing said message data includes:
when said message data is received, judging whether or not a specific telephone number corresponding to said message data is coincident with any one of said plurality of telephone numbers allocated to any one of said plurality of groups; and
determining said storage region used to store said message data based on said judgment result.

16. A mobile telephone comprising:
a storage unit;
means for setting a plurality of groups, each of a plurality of telephone numbers being allocated to any one of said plurality of groups; and
means for storing message data into a storage region of said storage unit corresponding to at least one of said plurality of groups based upon an identifier corresponding to said message data when said message data corresponding to one selected from said plurality of telephone numbers is received,
wherein said means for storing said message data includes:
means for judging whether or not a specific telephone number corresponding to said message data is coincident with any one of said plurality of telephone numbers allocated to any one of said plurality of groups when said message data is received;
means for storing said message data into said storage region corresponding to at least one of said plurality of groups, which is allocated with any one of said plurality of telephone numbers, which is coincident with said specific telephone number when said specific telephone number is coincident with any one of said plurality of telephone numbers; and
means for storing said message data into a remaining storage region other than the plurality of storage regions corresponding to said plurality of groups when said specific telephone number is not coincident with any one of said plurality of telephone numbers.

17. A mobile telephone comprising:
a storage unit;
means for setting a plurality of groups, each of a plurality of telephone numbers being allocated to any one of said plurality of groups; and
means for storing message data into a storage region of said storage unit corresponding to at least one of said plurality of groups based upon an identifier corresponding to said message data when said message data corresponding to one selected from said plurality of telephone numbers is received,
wherein said means for setting a plurality of groups, further includes
means for entering one of said plurality of telephone numbers,
means for entering a name of any one group of said plurality of groups, which is allocated with said entered telephone number, and
means for allocating said storage region to said group having said entered name.

18. A mobile telephone according to claim 17, further comprising:
means for reading said message data from said storage unit.

19. A mobile telephone according to claim 18, wherein said means for reading said message data includes:
means for designating at least one of said plurality of groups; and
means for reading said message data stored in said storage region corresponding to said designated one of said plurality of groups.

20. A mobile telephone according to claim 19, wherein said means for designating at least one of said plurality of groups includes:
means for displaying a list of names previously entered for said plurality of groups.

21. A mobile telephone according to claim 18, wherein said means for reading said message data includes:
in response to a message data readout request sent from an external appliance, outputting said message data which is stored in at least one of said plurality of storage regions corresponding to at least one of said plurality of groups designated by said message data readout request.

22. A mobile telephone according to claim 17, wherein said means for setting a plurality of groups, further comprises:
a plurality of units respectively allocated to said plurality of groups, wherein one of said plurality of units corresponding to said message notifies the reception of said message data.

23. A mobile telephone according to claim 22, wherein each of said plurality of units is previously allocated to one of said plurality of groups, and wherein said means for storing said message data further comprises:

means for producing one of a plurality of notification sounds which one sound is allocated to any one of said plurality of groups based upon said identifier corresponding to said message data when said message data is received.

24. A mobile telephone according to claim 17, wherein said means for setting a plurality of groups includes:

means for allocating said entered telephone number to any one of said plurality of groups.

25. A mobile telephone according to claim 17, wherein said means for setting a plurality of groups includes:

means for allocating said entered telephone number to at least two groups of said plurality of groups.

26. A mobile telephone according to claim 17 wherein said means for setting a plurality of groups includes:

means for entering a first one of said plurality of telephone numbers;

means for entering a name of a first one of said plurality of groups, which is allocated with said first telephone number;

means for allocating a first memory area of said storage region to said first group;

means for entering a second one of said plurality of telephone numbers;

means for entering as a second name, a name of a specific one of said plurality of groups which is allocated with said second telephone number;

means for judging whether or not said second name is coincident with the name of said first group; and means for allocating a second memory area of storage region to said specific group when said second name is not coincident with the name of said first group, and wherein said means for storing said message data includes:

means for storing said first telephone number into said first memory area;

means for storing said second telephone number into said first memory area when said second name is coincident with the name of said first group; and means for storing said second telephone number into said second memory area when said second name is not coincident with the name of said first group.

27. A mobile telephone according to claim 17, further comprising:

means for displaying a list of said entered names of said plurality of groups.

28. A mobile telephone according to claim 17, wherein said means for storing said message data stores said message data into said storage region where a single message data can be stored.

29. A mobile telephone according to claim 17, wherein said means for storing said message data stores a plurality of said message data into said storage region.

30. A mobile telephone according to claim 17, wherein said means for storing said message data includes:

means for judging whether or not a specific telephone number corresponding to said message data is coincident with any one of said plurality of telephone numbers allocated to any one of said plurality of groups when said message data is received; and means for determining said storage region for storing said message data based on the judgment result.

* * * * *